United States Patent Office 2,730,544
Patented Jan. 10, 1956

2,730,544

ALKYLAMINOALKYL ESTERS OF HYDROXY-CYCLOHEXYLBENZOIC ACID

Melville Sahyun and John A. Faust, Santa Barbara, Calif., assignors to Sahyun Laboratories, Santa Barbara, Calif., a corporation of California No Drawing. Application July 23, 1952,
Serial No. 300,527

6 Claims. (Cl. 260—473)

This invention relates to basic-alkyl esters of hydroxy-cyclohexylbenzoic acids and to their addition salts with acids.

Esters of this invention have the formula:

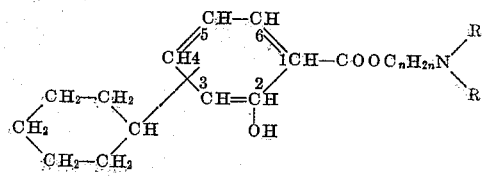

wherein R is a lower-alkyl group, the said R's being the same or different, wherein n is an integer from the group of 2, 3, or 4, and wherein the cyclohexyl group is substituted in the benzene ring in the 3, 4 or 5 position.

The esters of this invention are high-boiling liquids, readily soluble in most of the common organic solvents, but insoluble in water. The acid addition salts are generally crystalline solids with well-defined melting points and are readily soluble in cold water, methanol, or ethanol, moderately soluble in isopropanol, ethyl acetate, or methyl-ethyl ketone, and insoluble in the common aliphatic, cycloaliphatic, and aromatic hydrocarbon solvents, as well as in ether.

Members of this new group of compounds have been prepared and found to have value as germicides and bacteriocides, being very active at dilutions of one to ten thousand against fungi such as *Trichophyton rubrum*.

The compounds of the present invention can be prepared by the reaction of a cyclohexylbenzoic acid having the formula:

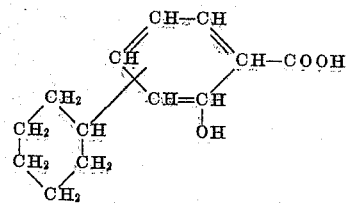

wherein the cyclohexyl group is attached to the 3, 4, or 5 position of the benzene ring, with a basic-alkyl halide having the formula:

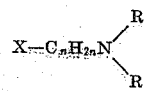

wherein R and n have the values hereinbefore assigned, and wherein X is a halogen from the group consisting of chlorine and bromine. The reaction is usually conducted in the presence of an inert diluent such as isopropanol. Preferably, reflux temperatures are employed; however, temperature higher or lower than reflux may be employed. Since the time required to complete the reaction is inversely proportional to the temperature employed, such higher or lower temperatures will, respectively, decrease or increase the time required to complete the reaction.

After heating the mixture, the solvent is removed, and the residue crystallized from a recrystallization agent for the material, such as a mixture of isopropanol and ether, to obtain the hydrochloride. The free ester can be recovered and purified by dissolving the crude hydrochloride in water, extracting the solution with ether to remove any remaining inert diluent or other water-insoluble substance, alkalizing with sodium hydroxide, and extracting with ether or other suitable organic solvent, leaving the free basic ester as a residue. The basic esters can be distilled under reduced pressure to obtain a higher degree of purity if desired.

Acid addition salts of the basic esters, such as the hydrochloride, hydrobromide, sulfate, phosphate, acetate, succinate, tartrate, benzoate, citrate, lactate, picrate, and other acid addition salts can be prepared readily by allowing the free ester to react with stoichiometric quantities of the selected acid in a solvent such as isopropanol or a mixture of ethanol and ethyl acetate. Upon distillation of the solvent, the salt remains as a residue which can be purified by recrystallization from ethanol or other suitable recrystallization agent. A mixture of ethyl alcohol and ethyl ethers is particularly useful, in most instances, for the crystallization.

A procedure which may be used to prepare the compounds of the present invention wherein the cyclohexyl ring is attached to the 3, 4 or 5 position of the phenyl radical is the catalytic hydrogenation of a phenyl-salicylic acid having the formula:

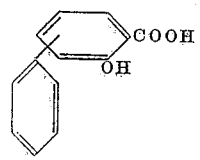

followed by esterification of the hydrogenated acid. We have found that Adam's platinum oxide is particularly suitable as the catalyst for hydrogenation of the phenyl-salicylic acids. The acid to be hydrogenated is usually dissolved in a solvent, such as aqueous acetic acid, the temperature maintained at between sixty and ninety degrees centigrade, preferably between seventy and eighty degrees centigrade, while a hydrogen pressure of between about thirty and seventy pounds per square inch gauge, preferably at about fifty pounds per square inch gauge, is maintained thereon. When the theoretical amount of hydrogen has been absorbed, which may require the addition of more catalyst during the hydrogenation, the free hydroxy-cyclohexylbenzoic acid may be separated and esterified in a manner hereinbefore described.

"Lower-alkyl," as used in this specification and the appended claims, is intended to include aliphatic groups having from one to five carbon atoms, inclusive. Representative groups include methyl, ethyl, propyl, isopropyl, butyl, secondary-butyl, tertiary-butyl, amyl, isoamyl, et cetera. The carbon chain of the alkylene group, $-C_nH_{2n}-$, can be either straight or branched chain. Representative alkylene groups which are contemplated within the scope of this invention include, for example, ethylene, propylene, isopropylene, butylene, secondary-butylene, tertiary-butylene, et cetera. Representative basic alkyl esters, which, among others, are within the scope of this invention, include: beta - dipropylaminobutyl 2 - hydroxy - 4 - cyclohexylbenzoate, gamma - dimethyl - aminopropyl 2 - hydroxy - 3 - cyclohexylbenzoate, beta - diisopropylamino - secondary - butyl 2 - hydroxy - 5 - cyclohexylbenzoate, gamma - dibutylaminobutyl 3 - hydroxy - cyclohexylbenzoate, beta - methylethylamino - ethyl 2 - hydroxy - 3 - cyclohexylbenzoate, et cetera.

The following examples are given to illustrate the present invention, but are not to be construed as limiting.

PREPARATION 1

A suspension of 10.7 grams of 5-phenylsalicylic acid in 150 milliliters of glacial acetic acid was intimately mixed with 0.2 gram of Adam's platinum oxide catalyst and placed in an autoclave. The mixture was maintained at a temperature of between seventy and eighty degrees centigrade while hydrogen under a pressure of about fifty pounds was passed into the autoclave. After about three hours, the theoretical amount of hydrogen had been absorbed. The catalyst was removed by filtration and the mixture concentrated to about fifty milliliters by vacuum distillation. The crystals which formed were separated by filtration and there was thus obtained approximately an 80–85 percent yield of 2-hydroxy-5-cyclohexylbenzoic acid, melting at 149–150 degrees centigrade.

Neutral equivalent:
Calculated: 220.26
Found: 219.0

PREPARATION 2

In a manner similar to that of Preparation 1, 4-phenylsalicylic acid and 3-phenylsalicylic acid respectively, may be converted to 2-hydroxy-4-cyclohexylbenzoic acid, melting at 160–161 degrees centigrade, and 2-hydroxy-3-cyclohexylbenzoic acid, melting at 159–160 degrees centigrade.

*Example 1.—Beta-diethylaminoethyl 2-hydroxy-5-cyclohexylbenzoate hydrochloride*

A mixture of 1.4 parts of beta-diethylaminoethyl chloride, 2.2 parts of 2-hydroxy-5-cyclohexylbenzoic acid, and 50.0 parts of isopropanol was refluxed for twelve hours and the solvent thereafter removed by distillation at a reduced pressure of about sixteen millimeters of mercury absolute. After two recrystallizations from a mixture of isopropanol and ether, 2.1 grams (sixty percent of the theoretical yield) of beta-diethylaminoethyl 2-hydroxy-5-cyclohexylbenzoate hydrochloride, as white, non-hygroscopic crystals, melting at 167–168 degrees centigrade, was obtained.

Analysis:
Calculated_____ N, 3.94  Cl, 9.96
Found _____    3.75      9.81

*Example 2*

In a manner similar to that of Example 1, the following compounds were prepared:

Beta-diisopropylaminoethyl 2-hydroxy-5-cyclohexylbenzoate hydrochloride, melting at 163–164 degrees centigrade.

Analysis:
Calculated_____ N, 3.65  Cl, 9.24
Found _____    3.56      9.49

Beta-dimethylaminoisopropyl 2-hydroxy-5-cyclohexylbenzoate hydrochloride, melting at 203–204 degrees centigrade.

Analysis:
Calculated_____ N, 4.10  Cl, 10.37
Found _____    4.16     10.20

Beta-diethylaminoethyl 2-hydroxy-4-cyclohexylbenzoate hydrochloride, melting at 161–162 degrees centigrade.

Analysis:
Calculated_____ N, 3.94  Cl, 9.96
Found _____    3.98     10.12

Beta-dimethylaminoisopropyl 2-hydroxy-4-cyclohexylbenzoate hydrochloride, melting at 162–164 degrees centigrade.

Analysis:
Calculated_____ N, 4.10  Cl, 10.37
Found _____    3.97     10.32

Beta-diisopropylaminoethyl 2-hydroxy-4-cyclohexylbenzoate hydrochloride, melting at 167–168 degrees centigrade.

Analysis:
Calculated_____ N, 3.65  Cl, 9.24
Found _____    3.63      9.34

Beta-dimethylaminoethyl 2-hydroxy-4-cyclohexylbenzoate hydrochloride, melting at 196–197 degrees centigrade.

Analysis:
Calculated_____ N, 4.27  Cl, 10.81
Found _____    4.26     10.92

Beta-diisopropylaminoethyl 2-hydroxy-3-cyclohexylbenzoate hydrochloride, melting at 166–167 degrees centigrade.

Analysis:
Calculated_____ N, 3.65  Cl, 9.24
Found _____    3.64      9.22

Beta-dimethylaminoethyl 2-hydroxy-3-cyclohexylbenzoate hydrochloride, melting at 206–207 degrees centigrade (with decomposition).

Analysis:
Calculated_____ N, 4.27  Cl, 10.81
Found _____    4.25     10.88

Beta-diethylaminoethyl 2-hydroxy-3-cyclohexylbenzoate hydrochloride, melting at 191–192 degrees centigrade.

Analysis:
Calculated_____ N, 3.94  Cl, 9.97
Found _____    4.03     10.16

Beta-dimethylaminoisopropyl 2-hydroxy-3-cyclohexylbenzoate hydrochloride, melting at 189–190 degrees centigrade.

Analysis:
Calculated_____ N, 4.10  Cl, 10.37
Found _____    4.20     10.21

*Example 3.—Beta-diethylaminoethyl 2-hydroxy-3-cyclohexylbenzoate bitartrate*

Approximately 3.5 parts of beta-diethylaminoethyl 2-hydroxy-3-cyclohexylbenzoate hydrochloride were dissolved in 125 milliliters of water, the resulting solution extracted with ether, the ether extracts discarded, and the aqueous solutions of the material made alkaline with sodium hydroxide, using a slight excess of alkali. Thereafter the alkaline mixture was extracted with three 25-milliliter portions of ether, the ether extracts dried over magnesium sulphate, and the ether removed by distillation. The free ester base was purified by distillation under reduced pressure to obtain a clear liquid, beta-diethylaminoethyl 2-hydroxy-3-cyclohexylbenzoate, boiling at 165–166 degrees centigrade at a pressure of 0.5 millimeter of mercury absolute.

1.9 parts of the ester base was dissolved in about five milliliters of methanol and a solution of 0.9 part of tartaric acid in approximately ten milliliters of methanol was added thereto. The solvent was removed by distillation at a pressure of about sixteen millimeters of mercury pressure absolute, and the residue purified by recrystallization from acetone. There was thus obtained 2.2 parts (79 percent of the theoretical yield) of beta-diethylaminoethyl 2-hydroxy-3-cyclohexylbenzoate bitartrate, as a white, non-hygroscopic powder, melting at 87–98 degrees centigrade.

In a manner similar to that of Example 3, beta-diethylaminoethyl 2-hydroxy-3-cyclohexylbenzoate picrate, as canary yellow crystals, melting at 123–124 degrees centigrade, was obtained from the free ester and picric acid.

This application is a continuation-in-part of our prior filed application Serial 183,674, filed September 7, 1950, now abandoned.

Various modifications may be made in the compounds and process of the present invention without departing from the spirit or scope thereof, and it is to be understood that we limit ourselves only as defined in the appended claims.

We claim:

1. A compound selected from the group consisting of (a) esters having the formula:

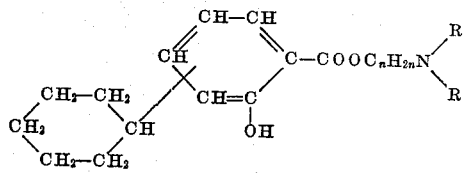

wherein R is a lower-alkyl group, $n$ is an integer from the group consisting of 2, 3 and 4, and wherein the cyclohexyl group is attached to the 3, 4 or 5 position of the phenyl ring, and (b) acid addition salts thereof.

2. Beta-diisopropylaminoethyl 2-hydroxy-3-cyclohexylbenzoate hydrochloride.

3. Beta-diethylaminoethyl 2-hydroxy-5-cyclohexylbenzoate hydrochloride.

4. Beta-diisopropylaminoethyl 2-hydroxy-4-cyclohexylbenzoate hydrochloride.

5. Beta-diethylaminoethyl 2-hydroxy-3-cyclohexylbenzoate hydrochloride.

6. Beta - dimethylaminoisopropyl 2 - hydroxy - 3 - cyclohexylbenzoate hydrochloride.

References Cited in the file of this patent
UNITED STATES PATENTS

| | | |
|---|---|---|
| 1,976,922 | Christiansen et al. | Oct. 16, 1934 |
| 1,998,750 | Bruson | Apr. 23, 1935 |